(12) United States Patent
Czernik

(10) Patent No.: US 12,741,726 B2
(45) Date of Patent: Sep. 22, 2026

(54) HEAD OF A CLOSED-CIRCUIT DIVING BREATHING APPARATUS (REBREATHER)

(71) Applicant: XDEEP SP. Z O.O. SP.K, Gora (PL)

(72) Inventor: Piotr Czernik, Gora (PL)

(73) Assignee: XDEEP SP. Z O. O. SP. K., Gora (PL)

( * ) Notice: Subject to any disclaimer, the term of this patent is extended or adjusted under 35 U.S.C. 154(b) by 699 days.

(21) Appl. No.: 18/037,988

(22) PCT Filed: Jan. 18, 2023

(86) PCT No.: PCT/PL2023/000003
§ 371 (c)(1),
(2) Date: May 19, 2023

(87) PCT Pub. No.: WO2024/155200
PCT Pub. Date: Jul. 25, 2024

(65) Prior Publication Data

US 2025/0074561 A1 Mar. 6, 2025

(51) Int. Cl.
*B63C 11/24* (2006.01)
*F16K 15/14* (2006.01)
*B63C 11/22* (2006.01)

(52) U.S. Cl.
CPC .............. *B63C 11/24* (2013.01); *F16K 15/14* (2013.01); *B63C 11/2245* (2013.01)

(58) Field of Classification Search
CPC ............... B63C 2011/021; B63C 11/02; B63C 11/18–24; B63C 11/2245; A62B 9/02–027; F16K 15/14; F16K 15/148; F16K 15/1481
See application file for complete search history.

(56) References Cited

U.S. PATENT DOCUMENTS 4,350,662 A * 9/1982 Dowgul .................. B63C 11/24 128/205.12
8,302,603 B1 * 11/2012 Weber ..................... B63C 11/24 128/205.12
2008/0295844 A1 * 12/2008 Turker ................... A62B 19/00 128/205.28

* cited by examiner

*Primary Examiner* — Brandy S Lee
*Assistant Examiner* — Abigayle Dale
(74) *Attorney, Agent, or Firm* — Andrzej Malarz, Esq.

(57) ABSTRACT

The object of the invention is a head (2) of a closed-circuit diving breathing apparatus (rebreather) comprising a body (5), tightly connected to the canister of the absorbent bed (4), provided with a plurality of connectors (6, 7, 9, 10) and in the body (5) of the head (2) there is an opening constituting the mounting seat (29) of the button (20) and an opening constituting the chamber (13) of the over pressure relief valve (12) characterized in that the over pressure relief valve (12) comprises, in sequence, a valve piston (14), a spring (15), a seat of the one-way valve (16) and a one-way valve (17), the spring (15) supported on the seat of the one-way valve (16) pushes the piston (14) against the body (5), the one-way valve (17) is attached in the seat of the one-way valve (16) and all components are attached to the body (5) by a tightly connected plug with openings (18).

6 Claims, 14 Drawing Sheets

4
3
A
6
1
20
4f
5
A

B-B
30
6
9
12
5
3
13a
3a
39
26
4e
4e
4d
4b
4a
4c
4f
41

A-A
41
4f
4c
4b
4a
4d
4e
4e
28
5
41
6

HEAD OF A CLOSED-CIRCUIT DIVING BREATHING APPARATUS (REBREATHER)

CROSS REFERENCE TO RELATED APPLICATIONS

The present application is a U.S. National Phase of International Patent Application PCT/PL2023/000003, filed on Jan. 18, 2023, the content of each is incorporated by reference in its entirety for all purpose.

TECHNICAL FIELD

The object of the invention is the head of a closed-circuit diving breathing apparatus (rebreather), particularly adapted for cooperation with carbon dioxide absorbent bed scrubber canisters with a cross flow (cross-flow scrubbers). The device is part of the diver's equipment in diving systems with a closed circuit of the breathing medium (CCR—closed-circuit rebreather). The head connected to the canister of the carbon dioxide absorbent bed, along with the other components of the system, forms a device called a rebreather (breathing apparatus with a closed circuit). The device allows both recreational diving and specialized technical diving. It allows it to be configured for a number of different configurations depending on the type of dive being carried out, it can be a conventional backmount configuration with one cylinder or a two-cylinder set as well as a sidemount configuration with cylinders mounted on the sides of the diver's body. The solution also allows for a dual rebreather configuration, in which two devices (primary and backup) are mounted to a single harness.

Diving systems with a closed-circuit breathing medium (CCR, rebreather) work on the principle that the diver breathes the same gas (enriched air, trimix) all the time and the carbon dioxide released by the diver is removed by a so-called absorbent. In an absorbent bed based on a catalytic chemical reaction, from the gas stream flowing through the absorbent, carbon dioxide is removed (by means of an exothermic reaction with the use of water). Absorbent is a mixture of lime and caustic soda and is in granular form (e.g. Sofnolime 797). Additionally, oxygen is supplemented in the breathing mixture by its controlled dosage to the breathing loop. The absorbent is located in a canister called a scrubber.

The detachable rebreather head, depending on the design, may contain, among other things, the connectors of the bayonet, dilution gas, oxygen, dive computers or a relief valve. Typically, sensors testing oxygen concentration ($O_2$ sensors) are also placed in the head, the most common being R22D-type oxygen sensors. The head is tightly connected to the canister during the dive. Detachable head designs make it easier to replace the absorbent in the scrubber and allow maintenance of the device and visual inspection.

Although the R22D-type sensor on the air intake side is protected by a hydrophobic membrane, its other end with the connector (three-pin Molex) is not protected against moisture and water. In some solutions, $O_2$ sensors are placed in enclosures designed to protect them from water. The protective housing has holes through which the testing gas enters, and thus through which water enters. If the protective enclosure were airtight, the sensor would not be testing the actual oxygen concentration in the rebreather, but its content inside the enclosure. It is also not possible to leave the sensor inlets properly sealed outside the hermetically sealed enclosure. The pressure difference between the two sides of the hydrophobic membrane inside the sensor, which occurs in such case, would adversely affect the quality of the measurement. For the above reasons, usually oxygen sensors in rebreathers are not protected from moisture and water in any way.

The standards and norms for diving equipment designed for technical diving and diving with CCR systems are much higher and stricter than those provided for recreational diving. Technical diving generally takes place in flooded confined spaces (with a ceiling over the diver's head) often without visibility of sunlight and the water surface. For example, technical diving may involve underwater industrial installations, caves or wrecks. In technical diving, cylinders are generally placed not on the back but on the sides of the torso (the so-called sidemount configuration). Due to the high danger, the small amount of space for maneuvering and the contamination of the water with various types of sediment, the equipment for this type of diving must be as small as possible, reliable and able to work in polluted water without fail.

The water inside the device is formed due to chemical reactions in the absorbent bed and from condensation of water vapor from the air. Water from outside can enter through the breathing loop tubes, for example, when a diver underwater, pulls out the mouthpiece without closing its valve (DSV, Dive Surface Valve). Another reason for water getting inside the rebreather could be a leaking excess pressure valve (OPV, Over Pressure relief Valve). OPV in most cases is a disc-shaped piston with an elastic seal, pressed against the seat with the help of a spring. Bending of the spring and opening of the valve occurs automatically if there is too much gas pressure inside the rebreather. Sand, other debris or particles of absorbent, in the case of careless filling of the bed, can get into the area of the valve, cause it to unseal, and thus leak into the device. Manual opening of the over pressure relief valve when there is no positive pressure inside the unit also causes its flooding. An extreme, but encountered, case may be the breaking of a relief valve spring. Water that enters the absorbent bed and causes it to become wet increases respiratory resistance and decreases bed's efficiency as its temperature drops. Cold absorbent is less effective because chemical reactions occur too slowly in it. To prevent flooding of the bed in CCR systems, water is collected in a counterlung or a special chamber called a water trap.

Two types of rebreathers are known and commonly used, usually in the form of a cylinder: with a radial flow filter and an axial flow filter.

BACKGROUND ART

From the US patent description U.S. Pat. No. 7,520,280B2 "Rebreather apparatus" a rebreather in which the scrubber canister with the bed has two side lids is known. In this solution there is no traditional head, the side covers are supplied with breathing loop lines and gas connections. One of the covers houses three oxygen sensors. A disadvantage of this type of solution is the inability to drain water from the bed and the lack of protection of the sensors from the impact of moisture and water.

From the US patent description U.S. Pat. No. 8,272,381B2 "Closed circuit rebreather", an axial rebreather is known. The head of the device is equipped with a bayonet, diluent, oxygen, dive computers connectors and with over pressure relief valve OPV. There are four $O_2$ sensors inside the head. The sensors inside the head are not protected from moisture and water and their connectors, especially when in contact with salty seawater, corrode quickly. Flooding of unsecured $O_2$ sensor connectors with water can result in erroneous oxygen concentration readings, necessitating a switch to open circuit and an immediate emergency ascent procedure. According to the patent description, the lower end of the scrubber canister with the absorbent may have a water trap adjacent to the counterlung with a water drain. The location of the water trap means that water and condensate must flow through the entire bed before being discharged into the water trap and counterlung. The over pressure relief valve located at the top of the head ensures that if it is unsealed due to sand, dirt or absorbent particles, the incoming water will flow through the entire absorbent bed before it enters the water trap.

A similar solution to the one described in the above patent, with the head detached from the scrubber canister, has been used in JJ-CCR[1] and Fathom Mk III CCR[2] systems, among others. In these devices, the head also includes bayonet, diluent gas, oxygen and dive computers connectors. The common feature of the above solutions is that the counterlung is placed in front of the scrubber, i.e. the exhaled air first goes to the counterlung and then to the head and the scrubber canister with the absorbent. If water enters the device through the mouthpiece, only part of the volume enters the head and bed because the counterlung in such designs is a water trap placed upstream of the scrubber canister with the bed.

[1]https://ii-ccr.com/the-ii-ccr-rebreather/#tab-811b86bc656980f07e4

[2]https://www.fathomdive.com/fathom-ccr/

The CCR KISS Sidewinder[3] system (which represents the closest state of the art) is equipped with two scrubbers. Each head is connected to an absorbent bed scrubber canister with axial tubular flow (in which gas flows from one end of the cylinder to the other). At the head of the first scrubber are the bayonet, connections of hoses supplying oxygen and diluent and an automatic ADV valve (ADV, Automatic Diluent Valve). In the head of the second one there are three oxygen sensors with a cable for connecting an oxygen monitoring device, an over pressure relief valve and a bayonet. The kit is equipped with a regulator with constant interstage pressure and a manual addition device (MAV, Manual Addition Valve), in which there is also a mass flow orifice. The counterlung is placed behind the scrubber canisters with absorbent and constitutes the lower connection of the scrubbers.

[3]https://www.kisssidewinder.com/en/unit-characteristics, https://www.kisssidewinder.com/opis-jednostki Exhalation, thanks to unidirectional valves in the breathing loop, is directed to the head of the first scrubber (exhale side), where oxygen is supplied from a mass flow orifice and diluent (via ADV) is added or more oxygen (via MAV). The gas then passes through the first scrubber canister with the absorbent, where it is for the first time cleaned of carbon dioxide, and, is pumped into the counterlung. The vacuum of inhalation then causes the counterlung gas to flow through a second scrubber canister with absorbent (inhale side), where a second carbon dioxide cleaning takes place. Before the gas re-enters the diver's lungs, three oxygen sensors in the second head measure the oxygen concentration.

The design has many advantages, including the ability to integrate with a diving harness and use it in various diving configurations. On the other hand, it is not without flaws. The chamber with the sensors, located under the sensors board in the head of the second scrubber, is not protected from moisture and water. Excess water accumulates in the counterlung, which is located between the scrubber canisters with absorbent. Water that enters the device through the breathing loop hoses first enters the head, then the bed and only finally is drained into the counterlung. The over pressure relief valve is a standard design used in rebreathers (as well as in dry suits, for example). A piston with a seal is pressed against the valve chamber by a spring, preventing the flow of gas. In the event of an overpressure, the valve is opened and when the pressure equalizes, it returns to its original position. As previously mentioned, debris around the valve can cause it to unseal (incompletely close) and water through the valve can get inside the device. The axial flow scrubber canister with the absorbent bed used, in which the diameter of the cylinder is about 100-120 mm and the thickness of the bed is 200 mm, makes the breathing resistance high (thick bed with a smaller diameter). The solution causes problems with the drainage of condensate, which must flow through the entire bed before it reaches the counterlung.

SUMMARY OF INVENTION

The device according to the invention reduces the above problems and inconveniences.

The head of a closed-circuit diving breathing apparatus (rebreather) according to the invention provides the possibility of working with a new type of scrubber canisters, with cross-flow with channels of constant pressure across the entire cross-section, characterized by lower respiratory resistance and larger bed volume.

The solution according to the invention ensures the tightness of the over pressure relief valve and eliminates the possibility of water entering the device through this route.

The head of a closed-circuit diving breathing apparatus (rebreather) according to the invention makes it possible to use a water trap located before the absorbent bed, and allows emptying the water trap of the water accumulated in it.

The head of a closed-circuit diving breathing apparatus (rebreather) according to the invention provides the electronics, connectors and sensors with an IP67 protection level.

The above tasks were achieved by making a head of a closed-circuit diving breathing apparatus (rebreather), which, according to the invention, includes a body that is sealed through a flange by means of an attachment ring in a scrubber canister of an absorbent bed. The scrubber canister is equipped with an aperture of the filling hole plugged with a plug with a spring, as well as an upper air channel and a lower air channel. The body is provided with at least one bayonet, at least one oxygen connector, at least one diluent connector or at least one dive computer connector. A hole is made in the head body, connected to the inside of the body, which is the button mounting seat and a hole connected to the inside of the body, which constitutes the over pressure relief valve chamber. The head of a closed-circuit diving breathing apparatus (rebreather) is characterized by the fact that the relief valve contains, in sequence, a valve piston, a spring, a one-way valve seat and a one-way valve. A spring supported on the seat of the one-way valve pushes the piston against the body. The one-way valve is mounted in the seat of the one-way valve. All elements are attached to the body with a plug with holes. The connection of the plug to the body is sealed with an o-ring.

It is preferable that the over pressure relief valve in the operating position of the scrubber is located at the bottom of the head, at the lowest point of the body, with its outlet pointing downward.

The proposed design of the over pressure relief valve and its location eliminates the possibility of water entering the device through this route. In the operating position of the device (when the diver's body is parallel to the water surface), the interior of the over pressure relief valve chamber is always filled with air, as its outlet faces downward and the one-way valve prevents water from being sucked into the chamber. The solution ensures complete tightness of the over pressure relief valve, even if the valve's piston is left in the open position below the opening pressure or if debris gets under the piston preventing it from fully closing.

Preferably, a lever is embedded in the head body, one arm of which adheres to the elastic membrane of the manual flush button and the other arm adheres via a through-hole to the piston of the over pressure relief valve.

Preferably, inside the head body, on the flange side of the scrubber canister connection, there is a cavity forming in combination with the scrubber canister a water trap chamber.

Preferably, the water trap chamber is connected by at least one through-hole to the over pressure relief valve chamber and the outlet of the water trap chamber is located in the over pressure relief valve chamber.

The water trap is located in front of the scrubber canister of the absorbent bed. The solution allows the water trap to be emptied of accumulated liquid through an over pressure relief valve. The design allows the water trap to be emptied via positive pressure or a manual flush button. The proposed solution prevents flooding of the absorbent bed with water due to the ability to remove excess water outside the device.

It is preferable that the body is provided with a cable channel connecting the cavity to the button mounting seat. At least one dive computer connection opening comes to the cable duct. To the body on the side of the button seat the cable channel cover is attached. The cover provided with ventilation openings. The openings are protected by a hydrophobic ventilation membrane. There is a gasket between the cover and the body. In addition, attached to the body on the cavity side are, in sequence, a PCB silicone gasket, an electronics PCB board and a gasket pressure plate with gaskets. Electrically connected to the electronics PCB board, the oxygen sensors are embedded in the pressure plate with gaskets. The sensors are attached by means of a canister plug spring attached to the body of the support plate.

The design ensures that the oxygen sensor connectors and the electronics PCB board with its connectors are protected from water. It provides sensors with free access of gas while eliminating access of liquids. By maintaining the same pressure value on both sides of the sensor's hydrophobic membrane, it enables the correct measurement of oxygen concentration. The solution provides electronics, connectors and sensors with an IP67 protection degree.

BRIEF DESCRIPTION OF DRAWINGS

The object of the invention is presented in an embodiment on the drawing of the head of a closed-circuit diving breathing apparatus (rebreather), wherein.

DESCRIPTION OF EMBODIMENTS

Figure 1:
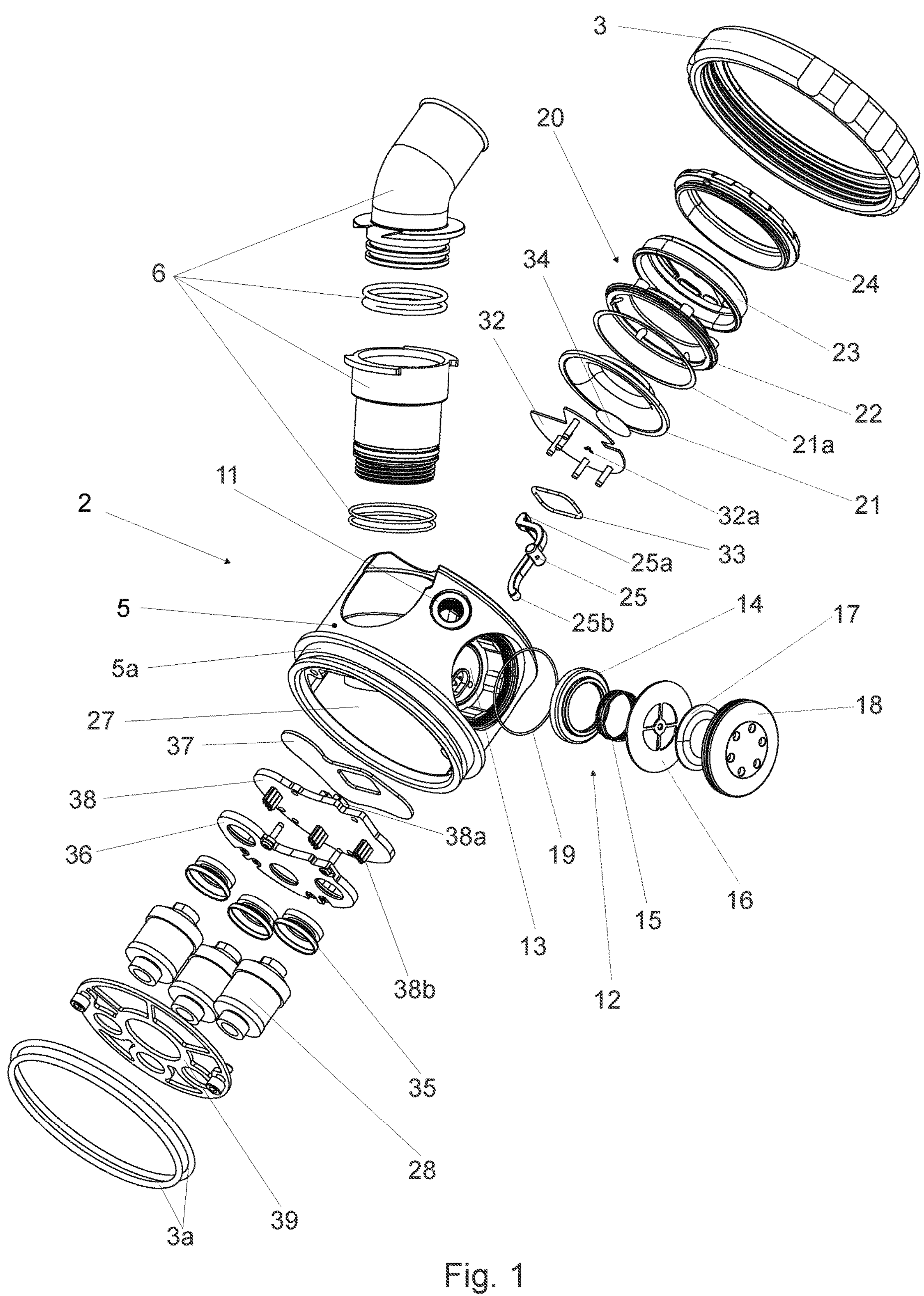
FIG. 1 presents an exploded view in isometric projection of the elements of the head of the inhale side ($O_2$ sensor head) of a closed-circuit diving breathing apparatus (rebreather)
Figure 2:
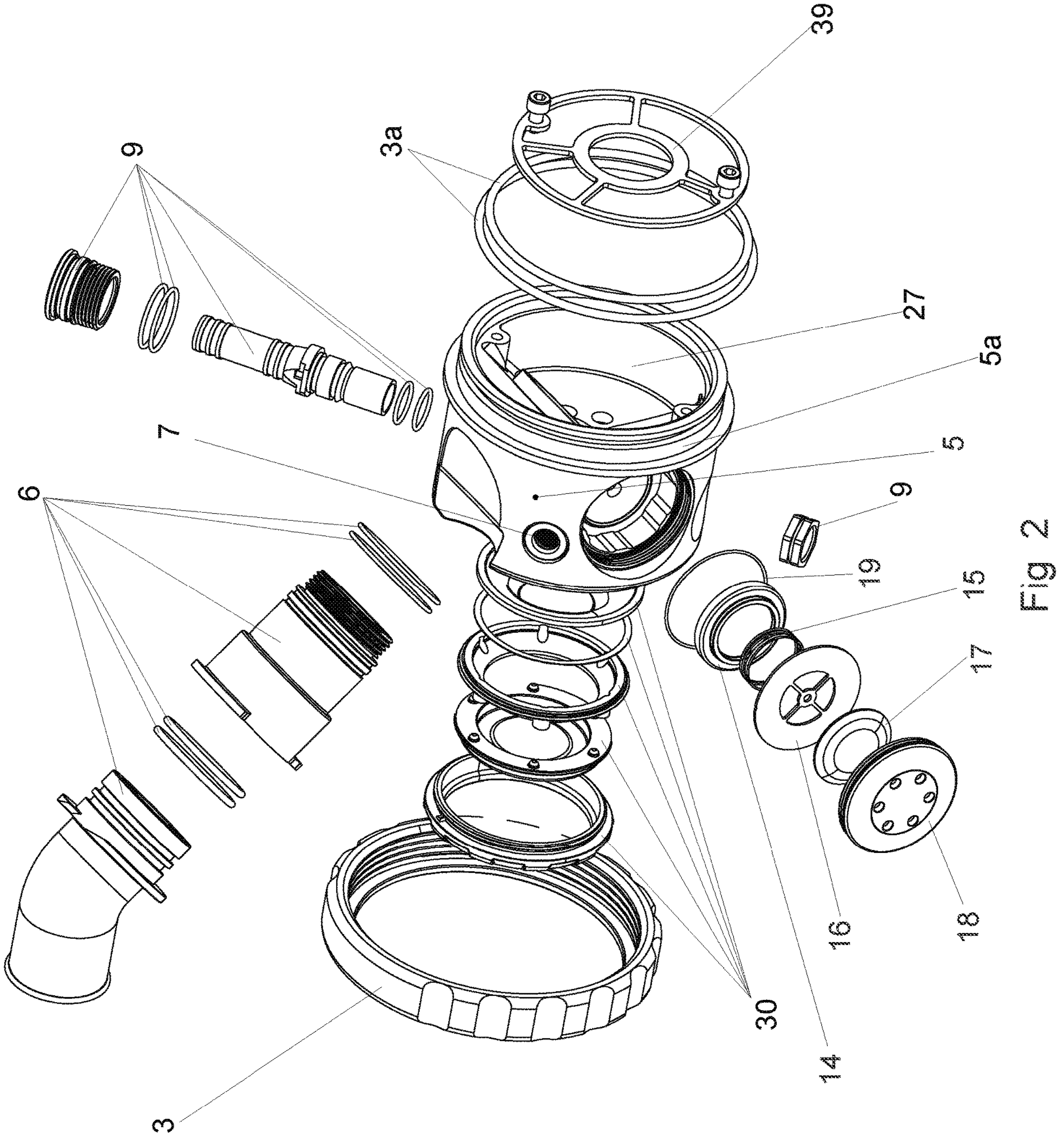
FIG. 2 presents an exploded view in isometric projection of the elements of the head of the exhale side (ADV head) of a closed-circuit diving breathing apparatus (rebreather)
Figure 3:
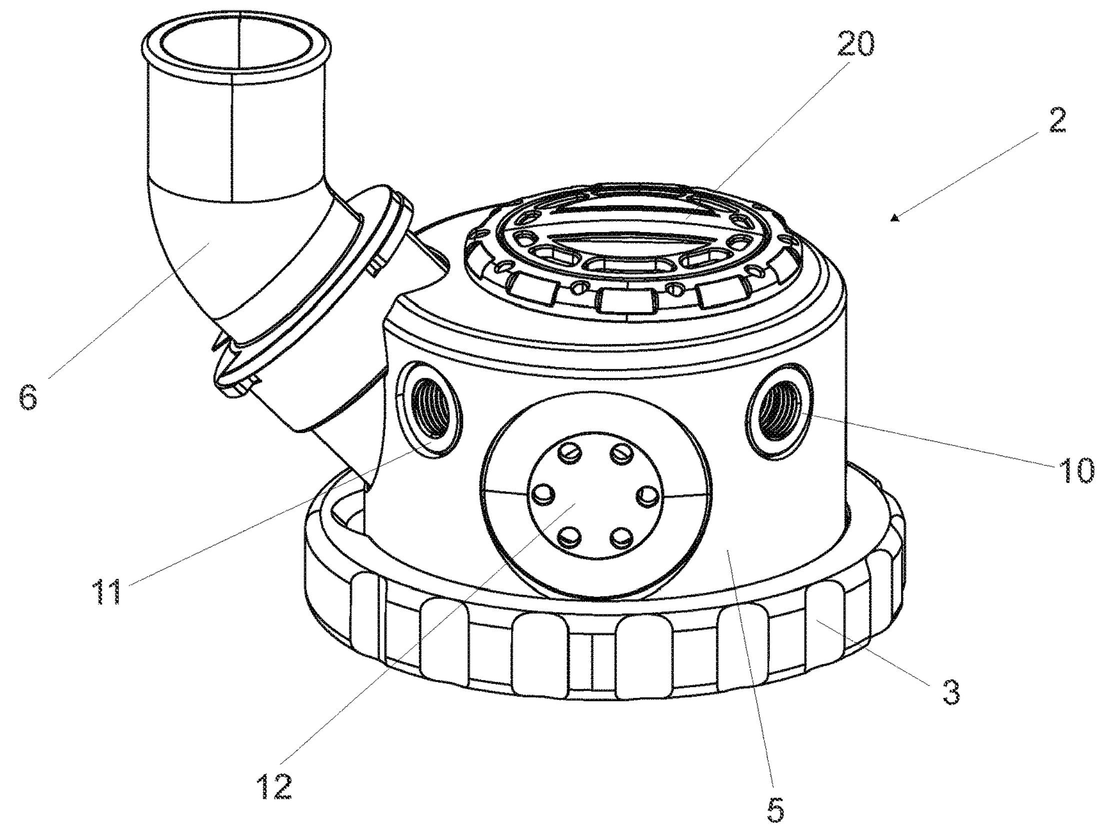
FIG. 3 presents an isometric view of the over pressure relief valve side of the head of the inhale side ($O_2$ sensor head)
Figure 4:
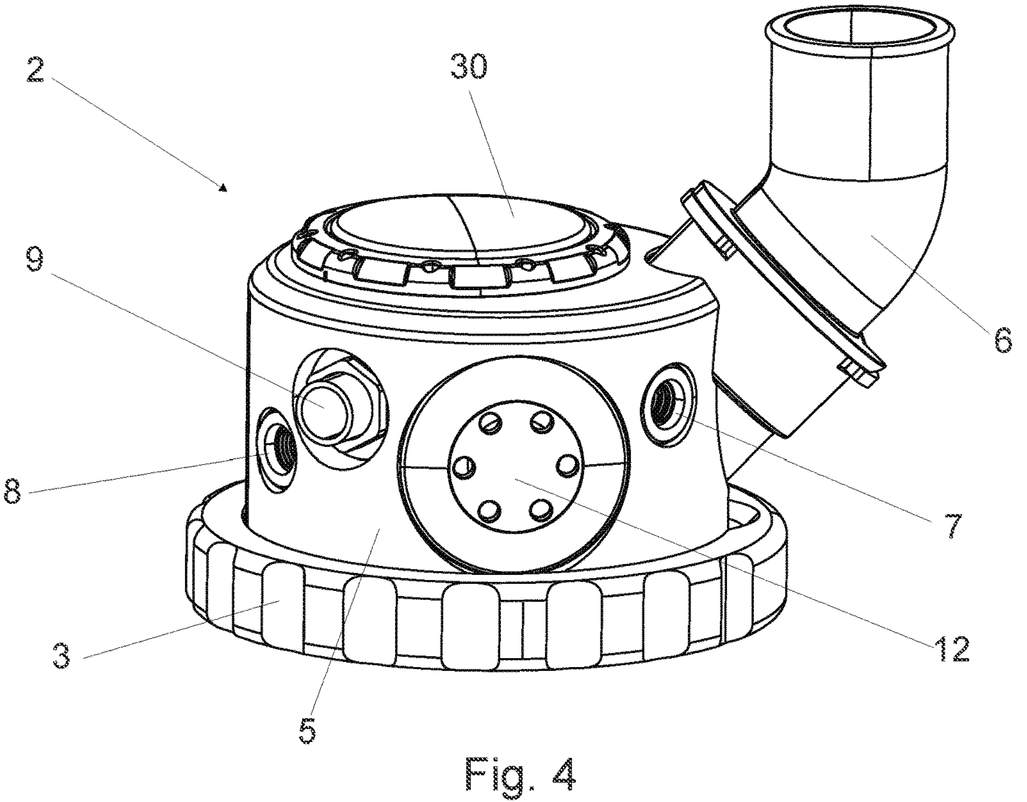
FIG. 4 presents an isometric view of the over pressure relief valve side of the head of the exhale side (ADV head)
Figures 5, 6:
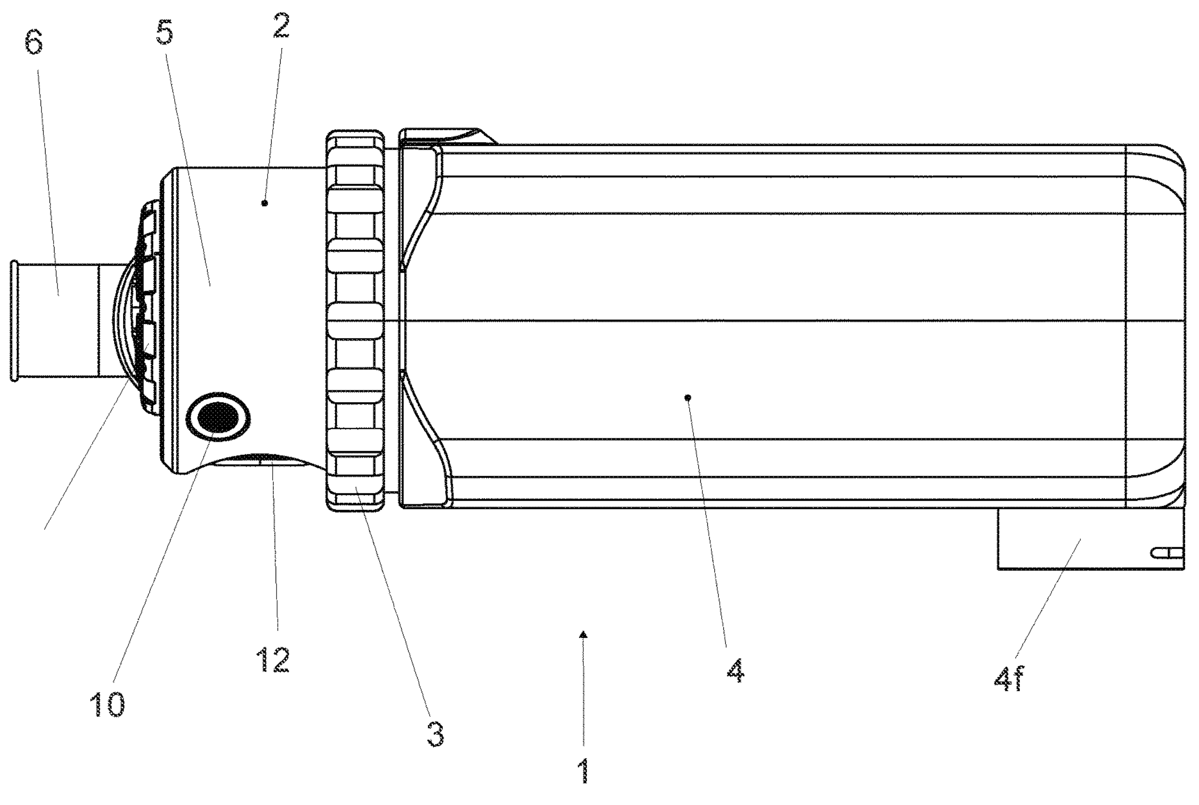
FIG. 5 presents a side view of the inhale side head ($O_2$ sensor head) along with the scrubber canister working position of the device.
FIG. 6 presents a front view of the inhale side head ($O_2$ sensor head) along with the scrubber canister with the marked line of cross-section A-A-working position of the device.
Figure 7:
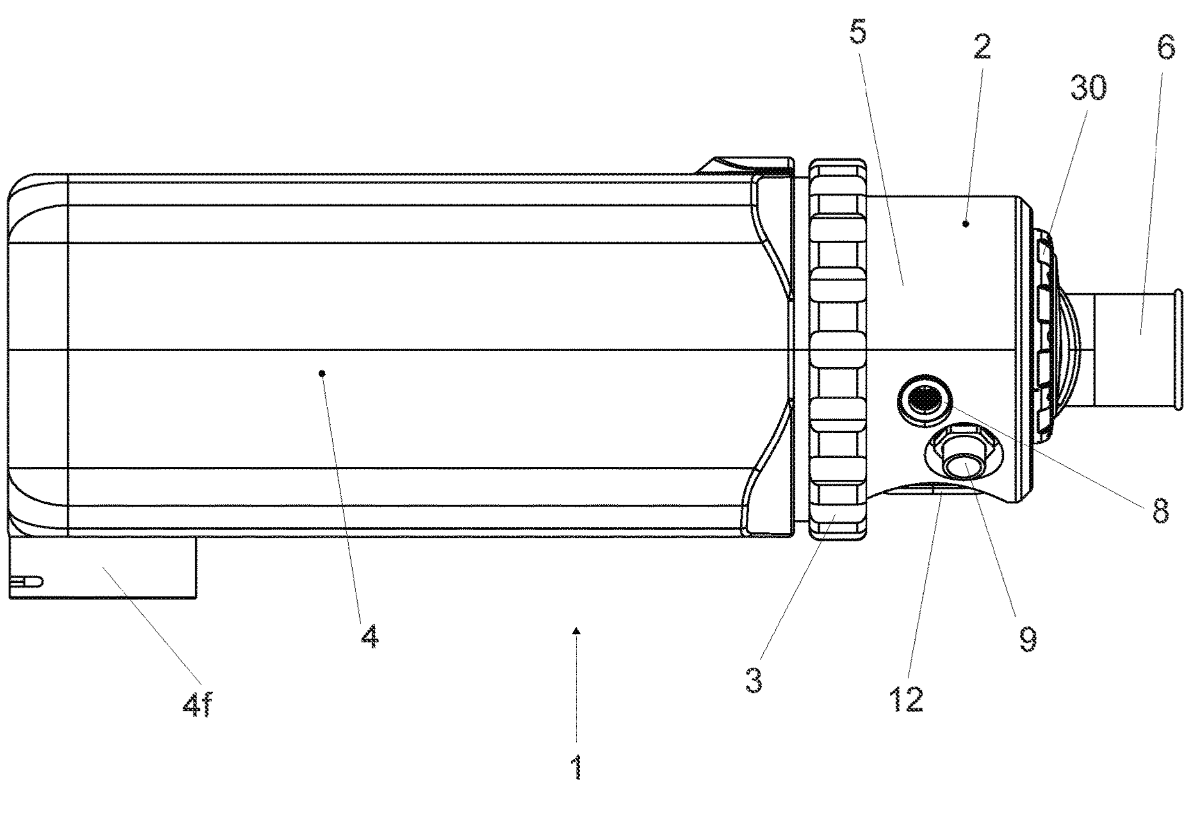
FIG. 7 presents a side view of the exhale side head (ADV head) along with the scrubber canister-working position of the device.
Figure 8:
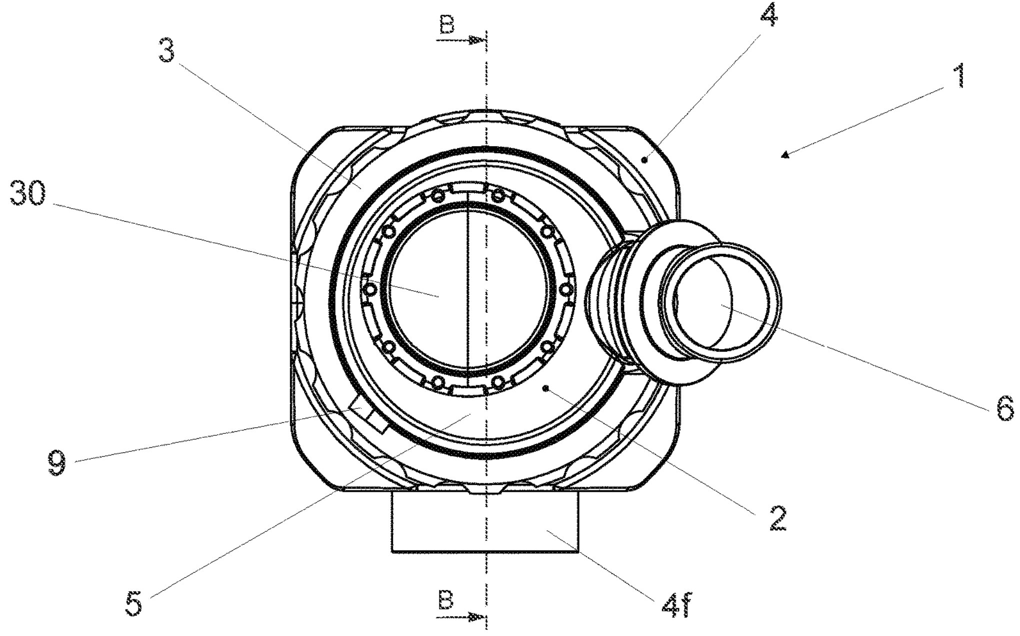
FIG. 8 presents a front view of the head of the exhale side (ADV head) along with the scrubber canister with the marked line of cross-section B-B-working position of the device.

Designations of directions refer to the working position of the rebreather head, that is, the position in which the diver's body is parallel to the water surface.

In an embodiment of the invention, a CCR system equipped with two scrubbers (canisters with heads) is presented (1). The head (2) is tightly attached, using a retaining ring (3), to the scrubber canister of the absorbent bed (4). The tightness of the scrubber canister's attachment is ensured by two gaskets (3*a*).

A new type of cross-flow scrubber canister (4) with channels of constant pressure over the entire cross-section (the subject of another parallel patent application) was used. In this type of solution, the absorbent bed (4*a*), the cross-section of which has a rectangular shape, is positioned at an angle to the longitudinal axis of the scrubber canister. The upper air channel (4*b*) is connected to the head (2). The cross-section of the upper air channel (4*b*) has a rectangular shape, the area of which increases toward the head (2). The lower air channel (4*c*) is connected through the connector (4*f*) with the counterlung (40). The cross-section of the lower air channel (4*c*) has a rectangular shape, the area of which decreases in toward the head (2). The filling port of the scrubber canister is blocked by a plug with a spring (4*d*) embedded in the aperture (4*e*) of the filling port. From side of the head (2), gas access to the inside of the scrubber canister (4) is possible through the upper air channel (4*b*). From the side of the counterlung (40), gas access to the inside of the canister (4) is possible through the lower air channel (4*c*).

The head (2) of the first scrubber, located on the exhale side, serves as the ADV head. The head (2) of the second scrubber, located on the inhale side, serves as the $O_2$ sensors head.

The housing and supporting element for all components of the head (2) is the body (5). The body (5) has a cylindrical shape, in which one of the bases is open and provided with a flange (5*a*) used for seating the head (2) in the scrubber canister (4). The external appearance and shape of the body (5) is identical in all cases. The arrangement of openings, mounting seats and chambers inside the body (5) can vary, depending on the role the head serves. In the embodiment, the body (5) is made of plastic.

The body (5) of the head (2) of the first scrubber is provided with a bayonet (6), a connector for the automatic oxygen addition valve (solenoid) (7), a connector for the manual addition valve MAV (8) and a diluent gas connector for the automatic diluent valve ADV (9).

The body (5) of the head (2) of the second scrubber is provided with a bayonet (6), a primary dive computer connector (10) and a backup dive computer connector (11).

The diver's exhalation, thanks to one-way valves in the breathing loop, is directed through the bayonet (6) to the head (2) of the first scrubber (exhale side). Oxygen is supplied through the connector of the automatic addition valve (7) (solenoid valve controlled by solenoid action) or through the connector of the manual addition valve MAV (8). Through the diluent gas connector for the automatic diluent valve ADV (9), diluent is added as needed. Then the gas passes through the first canister with the absorbent (4) (exhale side), where it is cleaned of carbon dioxide for the first time, and, is injected into the counterlung (40). The vacuum of inhalation then causes the gas from the counterlung (40) to flow through a second scrubber canister with the absorbent (4) (inhale side), where another carbon dioxide cleaning takes place. The gas flows through the head (2) of the second scrubber (inhale side) and then flows out the bayonet (6) and through the breathing loop hoses into the diver's lungs.

An opening is made in the body (5) of the head (2), which constitutes the chamber (13) of the over pressure relief valve (12). The chamber (13) of the over pressure relief valve (12) is connected to the inside of the body by the valve's through-holes (13*a*).

The over pressure relief valve (12) contains, in sequence, the valve piston (14), spring (15), one-way valve seat (16) and one-way valve (17). The spring (15) supported on the seat of the one-way valve (16) pushes the piston (14) against the body (5). The one-way valve (17) is a silicone umbrella valve attached in the one-way valve seat (16). All elements are attached to the body (5) with a screwed plug with openings (18). The seal between the plug (18) and the body (5) is an elastic o-ring (19).

The over pressure relief valve is automatically activated when a threshold pressure difference, called the opening pressure, is exceeded. When the pressure inside the rebreather increases, the forces acting on the piston (14) causes it to move and open the valve (12). The gas enters the chamber (13) of the valve (12) and then escapes through the one-way valve (17) and the openings of the plug (18). When the pressures equalize, the spring (15) causes the piston (14) to return to its previous position and close the valve (12). The one-way valve (17) prevents water from getting inside the head (2) even if foreign objects get under the piston (14) blocking its full closure. In addition, in the operating position of the scrubber (1), the over pressure relief valve (12) is located at the bottom of the head (2), at the lowest point of the body (5), with its outlet pointing downward. The interior of the chamber (13) of the over pressure relief valve (12) is always filled with air, as its outlet faces downward. The one-way valve (17) prevents water from being sucked into the chamber (13).

The over pressure relief valve (12) can be further equipped with a button of the manual flush of the Manual Relief Valve (MRV) (20), allowing it to be opened manually. The manual flush button (20) itself is a conventional design also found in the button of the automatic diluent valve (30) used in, among other things, the second stage of a scuba diving regulator (e.g., patent description PL229940B1 "Second stage of a diving apparatus"). It consists of an elastic membrane (21), washer (21*a*), membrane retaining ring (22), membrane cover (23) and membrane cover retaining ring (24). A lever (25) is embedded in the head body, the first arm (25*a*) of which is attached to the elastic membrane (21) of the manual flush button (20) and the second arm (25*b*), passing through one of the through-holes (13*a*) adheres to the piston (14) of the over pressure relief valve (12). Pressing the manual flush button (20) causes the elastic membrane (21) to bend and swings the lever (25), which pushes the piston (14) causing the manual opening of the over pressure relief valve (12). When the button (20) is released, the spring (15) causes the piston (14) and lever (15) to return to their previous position and closing the valve (12).

If the over pressure relief valve (12) is opened manually below the opening pressure, water access to the interior of the device is blocked by the check valve (17).

The proposed design and location of the over pressure relief valve (12) ensures its complete tightness, even in the event that the piston (14) is left in the open position below the opening pressure.

In the proposed solution, the over pressure relief valve (12) also has a second function, i.e. it allows manual or automatic draining of the water trap (26).

Inside the body (5) of the head (2), on the side of the connector flange (5*a*) of the scrubber canister (4), there is a cavity (27). When the head (2) is connected to the scrubber canister (4), the cavity (27) together with the canister (4) forms a chamber of the water trap (26) restricted on the side of the head by the housing of the body (5) and on the side of the scrubber canister by its plug (4*d*), aperture (4*e*) and housing of the scrubber canister (4).

Since the bed is sealed with a plug (4*d*) embedded in the aperture (4*e*) of the filling port of the scrubber canister (4), access of water to the bed is possible only through the upper air channel (4*b*). Condensate formed inside the head and breathing loop due to condensation of water vapor from the air or water that enters through the mouthpiece is collected in a water trap (26). The water trap chamber (13) is connected to the over pressure relief valve chamber through-hole (13*a*) of the valve.

In the working position of the scrubber (1), in order for water to pass from the head (2) to the upper air channel (4*b*), and thus flood the absorbent bed (4*a*), it must reach a correspondingly high level. The water trap (26) is drained of liquid through an over pressure relief valve (12).

Automatic draining of the water trap (26) occurs when the gas inside the rebreather reaches the opening pressure of the valve (12). Manual emptying of the water trap is performed after manual addition of diluent and manual opening of the over pressure relief valve (12).

The proposed design of the head (2) of the closed-circuit diving breathing apparatus (rebreather) allows positioning of the water trap (26) in front of the absorbent bed scrubber canister (4). The proposed solution prevents flooding of the absorbent bed (4*a*) with liquid due to the ability to remove excess liquid outside the device.

Inside the body (5) of the head (2) located on the inhale side are three oxygen sensors (28). Their task is to measure the concentration of oxygen in the gas inhaled by the diver. In the embodiment, R22D Molex sensors were used. The sensor of this type, on the air inlet side (measuring side), is protected by a hydrophobic membrane. As mentioned earlier, the other side of the sensor, where the three-pin Molex connector is located, is not protected from moisture and water (especially salty seawater).

In the body (5) there is a cable channel (31) connecting the cavity (27) with the mounting seat (29) of the button (20). The cable channel (31) is reached by the opening (10*a*) of the primary dive computer connector (10) and the opening (11*a*) of the backup dive computer connector (11). The cable channel (31) on the side of the seat of the MRV button (20) is secured by a screwed cable channel cover (32). The connection between the body (5) and the cover (32) is secured by a rectangular gasket (33). In the cover (32) there are made ventilation openings (32*a*) to ensure the free flow of gas through the cable channel (31). The openings (32*a*) are protected by a hydrophobic ventilation membrane (34), which prevents water from entering through the openings (32*a*). The embodiment uses a self-adhesive hydrophobic ventilation membrane (34) GORE® Protective Vents Adhesive Series.

In the body (5), on the side of the cavity (27), there are, in sequence, a PCB silicone gasket (37), electronics PCB board (38) and pressure plate (36) with gaskets (35). All components are bolted to the body (5) with screws.

The dive computer connectors (38*a*) located on the electronics board (38) can be accessed through the cable channel (31) and the opening in the PCB silicone gasket (37). The oxygen sensor connectors (38*b*) located on the electronics board (38) can be accessed through the opening of the pressure plate (36) and openings of the gaskets (35).

Each oxygen sensor (28), on the side of its Molex connector, is mounted in a properly molded silicone gasket (35) embedded in the gasket pressure plate (36) and connected to connectors (38*b*) on the electronics board (38). Openings are made in the PCB board (38) at each sensor connection connector (38*b*) to ensure free flow of gas. The oxygen sensors (28) are held in position and pressed against the gaskets (35) by the scrubber canister plug spring support plate (39) screwed to the body (5).

The proposed design protects the connectors of the oxygen sensors (28) and the electronics PCB board (38), along with the connectors (38*a*, 38*b*), from the influence of water. It provides free access of gas at the same time eliminating access of liquids. The gas pressure is the same throughout the head (2). Since the pressure is the same on both sides of the hydrophobic membrane of the sensor (28), it is possible to measure the oxygen concentration correctly.

The proposed design of the head of a closed-circuit diving breathing apparatus (rebreather) according to the invention provides the electronics (38), connectors (38*a*, 38*b*) and sensors (28) with an IP67 protection degree.

Figures 11, 12:
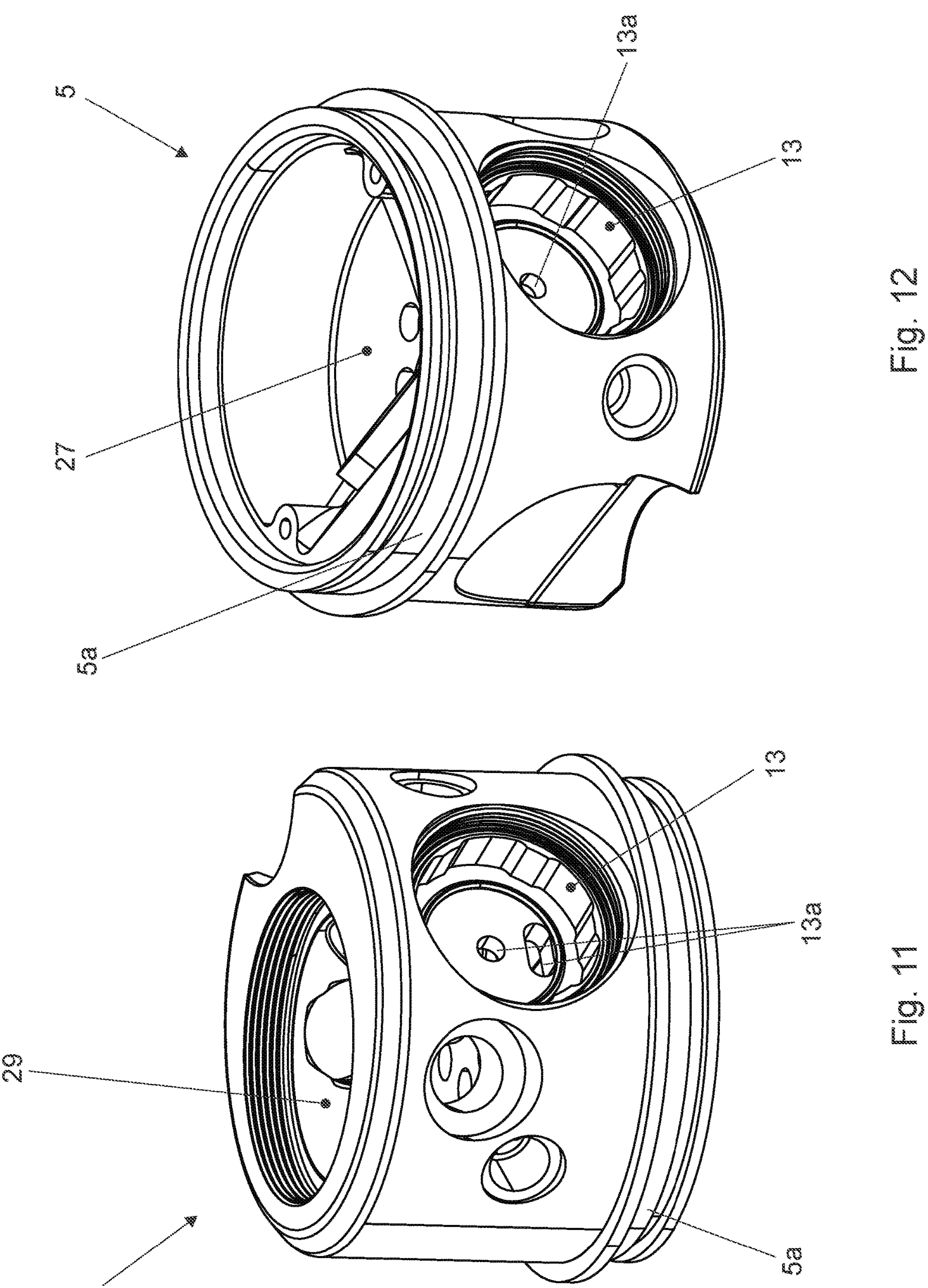
FIG. 11 presents an isometric view of the body of the exhale side head (ADV head), a view of the button mounting seat and over pressure relief valve chamber.
FIG. 12 presents an isometric view of the body of the exhale side head (ADV head), a view of the cavity inside the body and the chamber of the over pressure relief valve.
Figure 13:
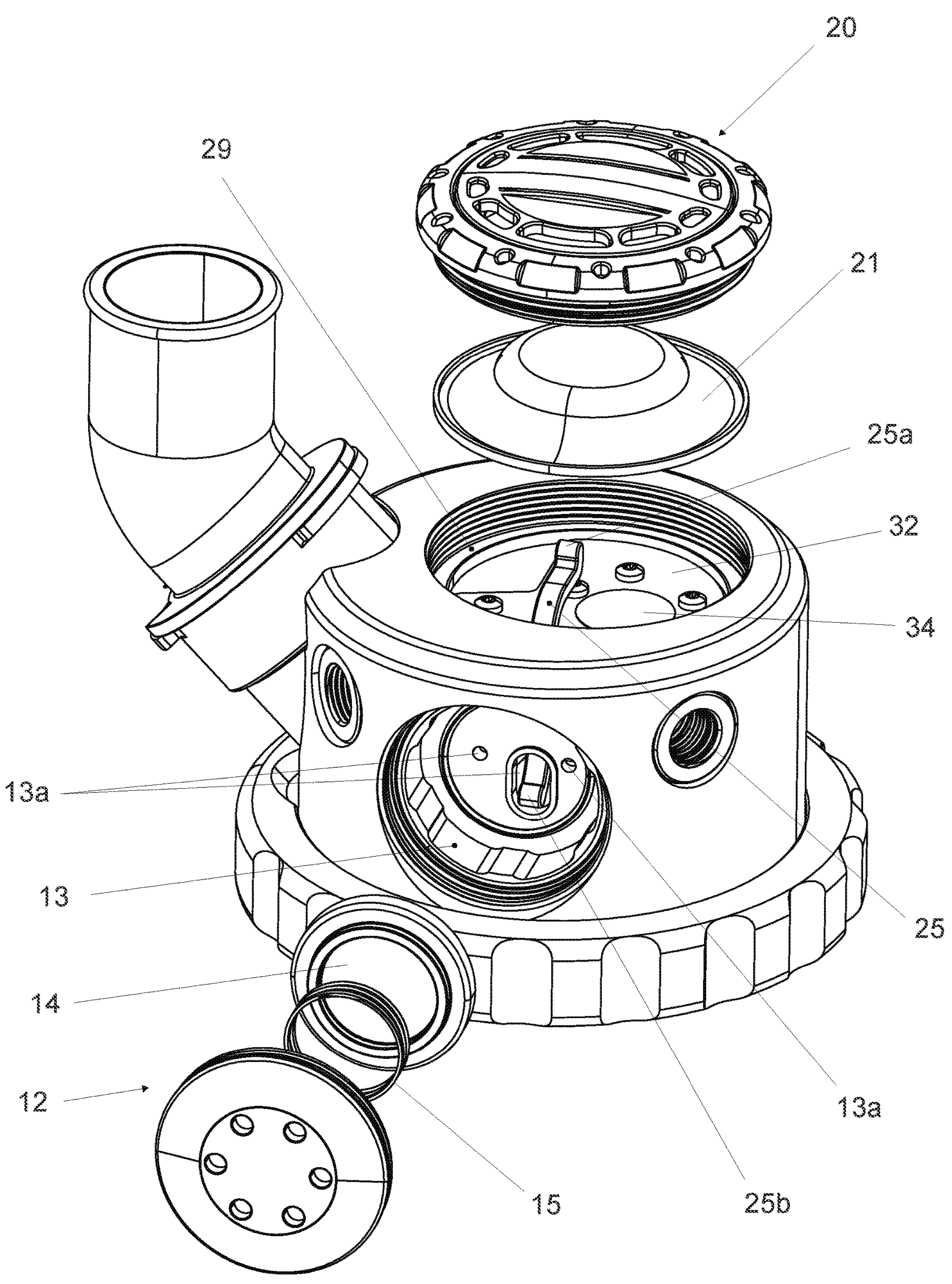
FIG. 13 presents an isometric view of the body of the inhale side head ($O_2$ sensor head), a view of the lever with the mating elements: the piston of the over pressure relief valve and the elastic membrane of the manual flush button.
Figure 14:
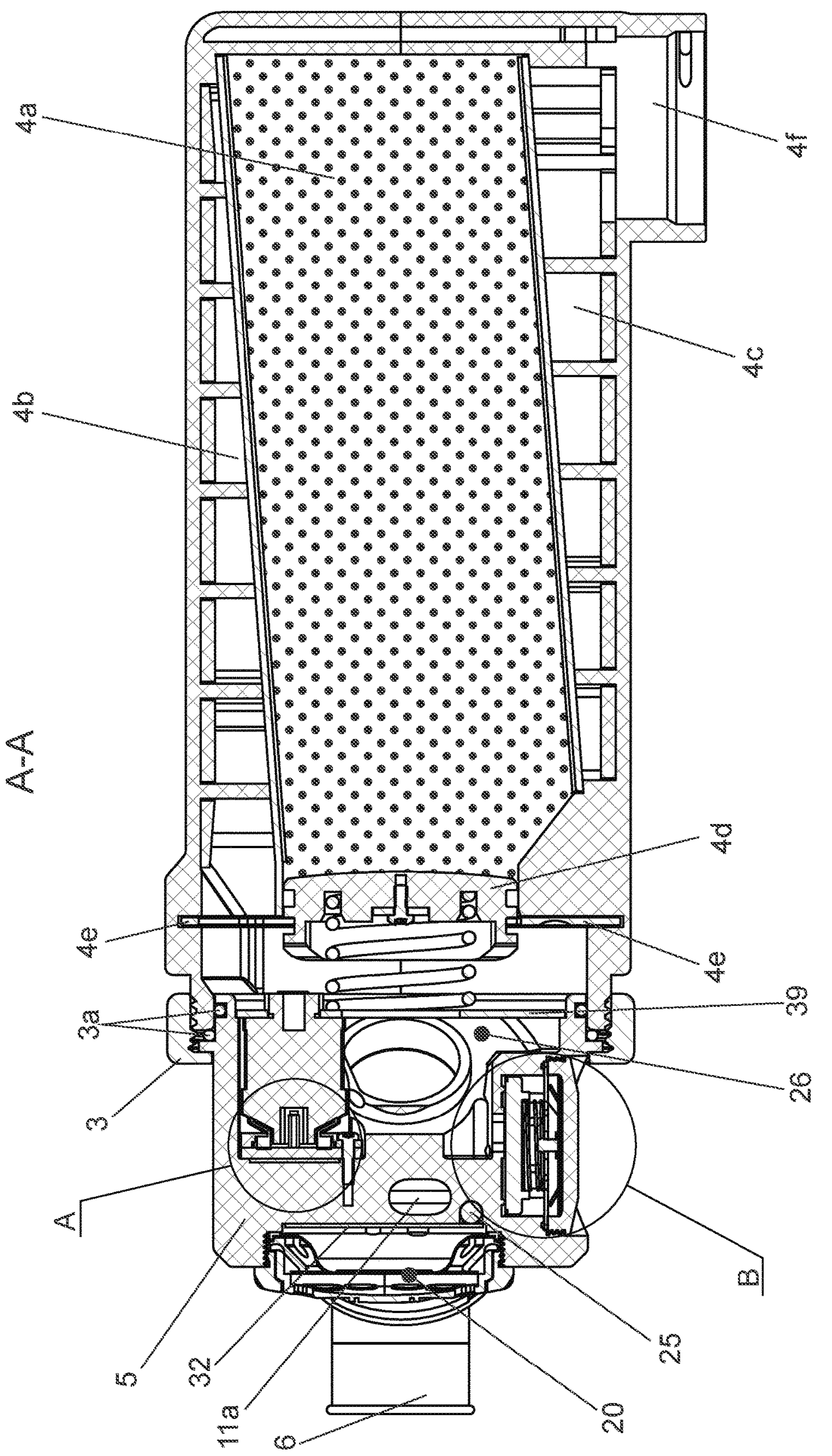
FIG. 14 presents cross-section A-A FIG. 6.
Figure 16:
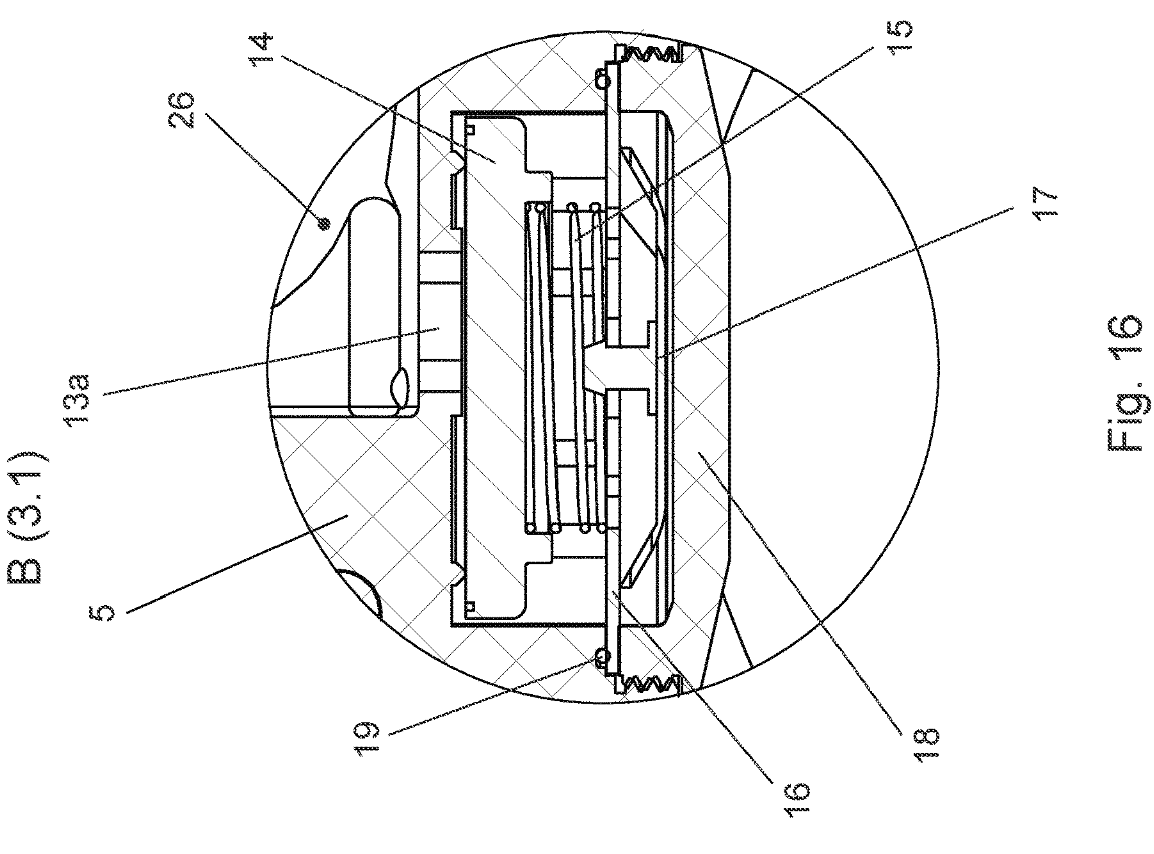
FIG. 16 presents detail B FIG. 14 in 3:1 scale.

To better illustrate the invention, its use in two example configurations is presented, along with the marked direction of gas flow (41). In the backmount configuration (with one cylinder on the back) on FIG. 10 and in sidemount configuration (with two cylinders on the sides) on FIG. 11.

Figure 10:
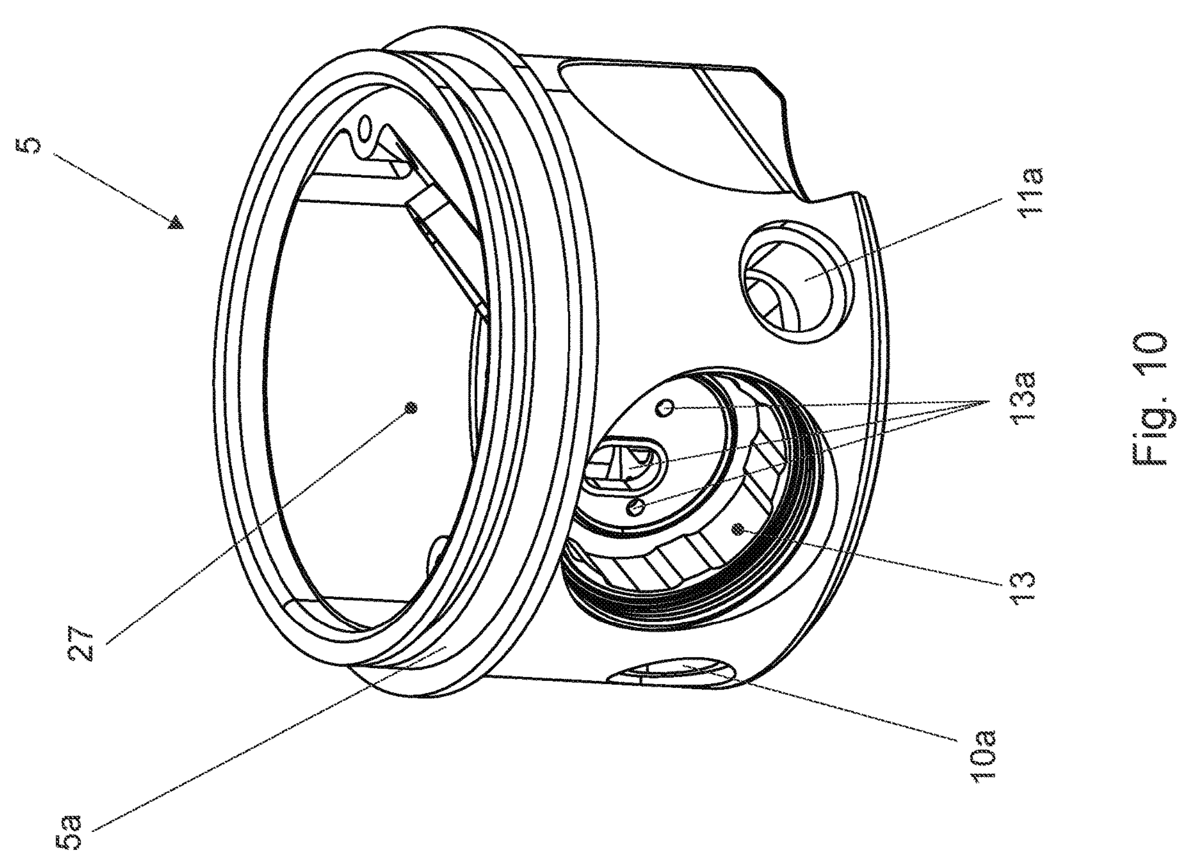
FIG. 10 presents an isometric view of the body of the inhale side head ($O_2$ sensors head), a view of the cavity inside the body and the chamber of the over pressure relief valve.
Figure 9:
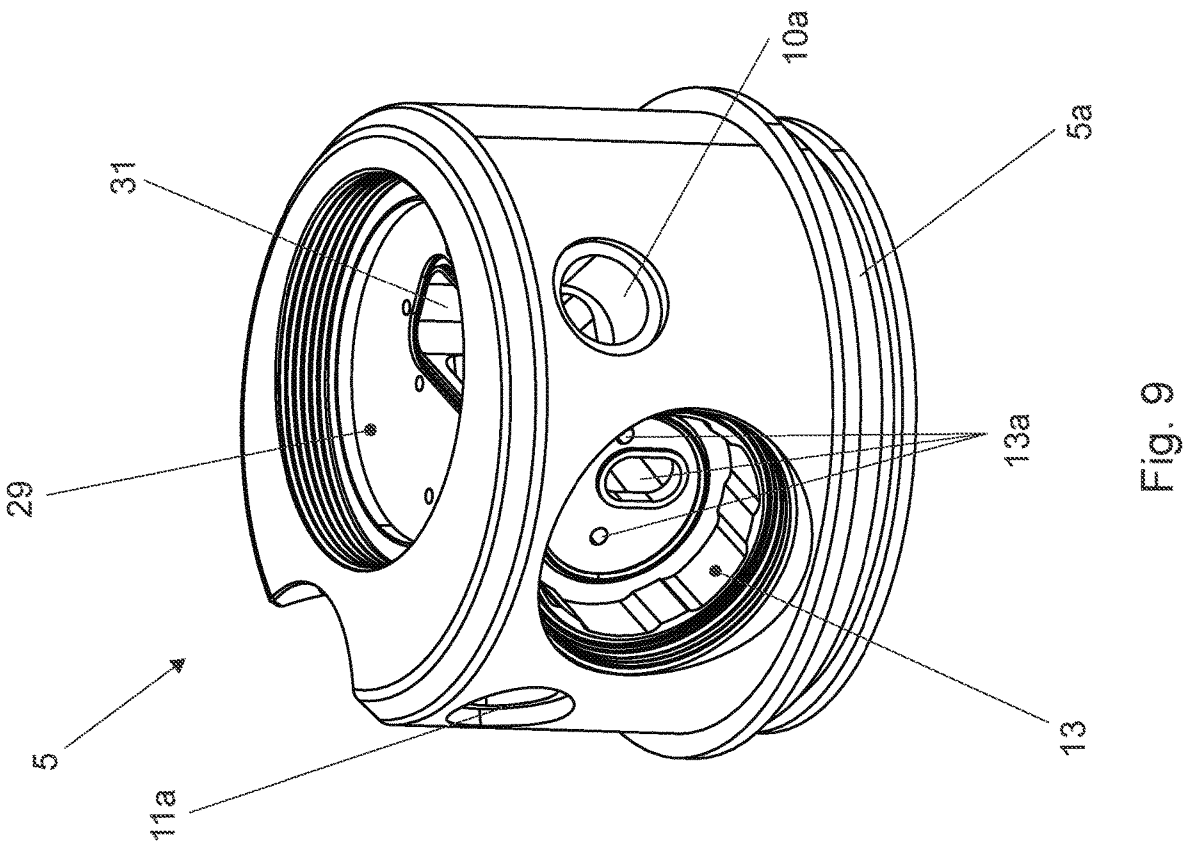
FIG. 9 presents an isometric view of the body of the inhale side head ($O_2$ sensors head), a view of the button mounting seat and over pressure relief valve chamber.

In the diving configuration shown on FIG. 10 backmount with one cylinder there are two identical scrubber canisters (4). The head (2) on the exhale side is the ADV head and the head on the inhale side is the sensors head. The scrubbers (1) are attached to the clamps (not visible in the figure) of the rigid diving harness (42) and connected via connector (4*f*) to the counterlung (40). The buoyancy compensator (43) is located on the sides of the scrubbers (1). In the configuration shown, one diluent cylinder (44) (air or trimix) is attached to a rigid diving harness (42).

Figure 15:
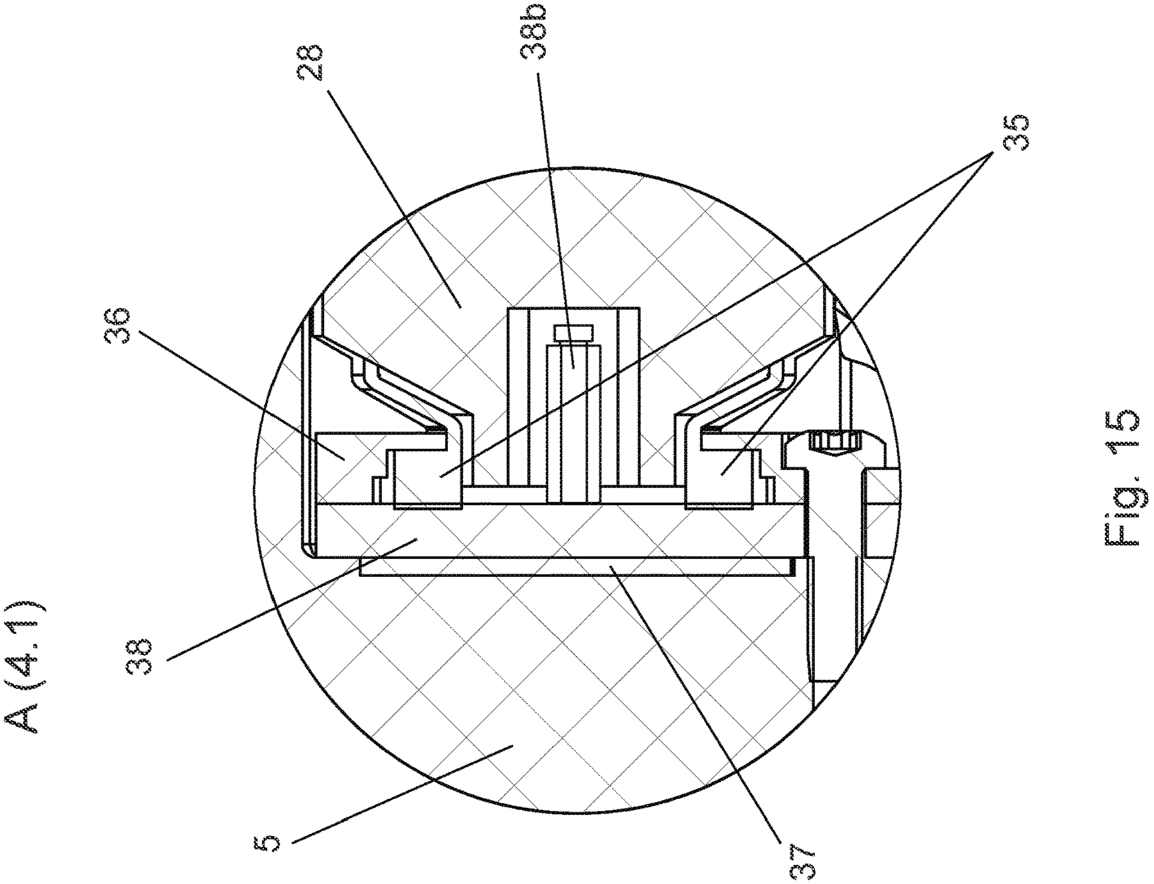
FIG. 15 presents detail A FIG. 14 in 4:1 scale.
Figure 17:
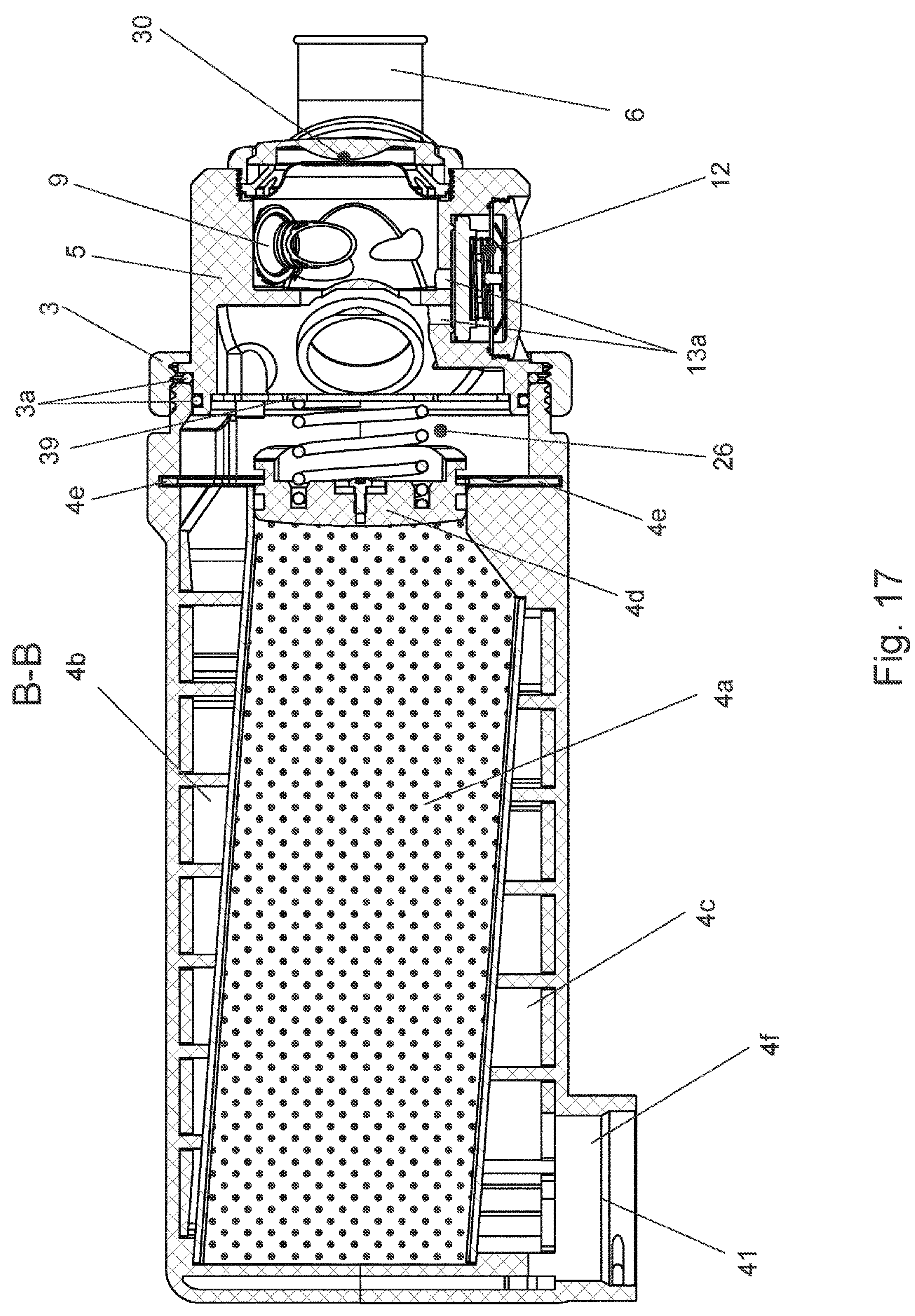
FIG. 17 presents cross-section B-B FIG. 8.
Figure 18:
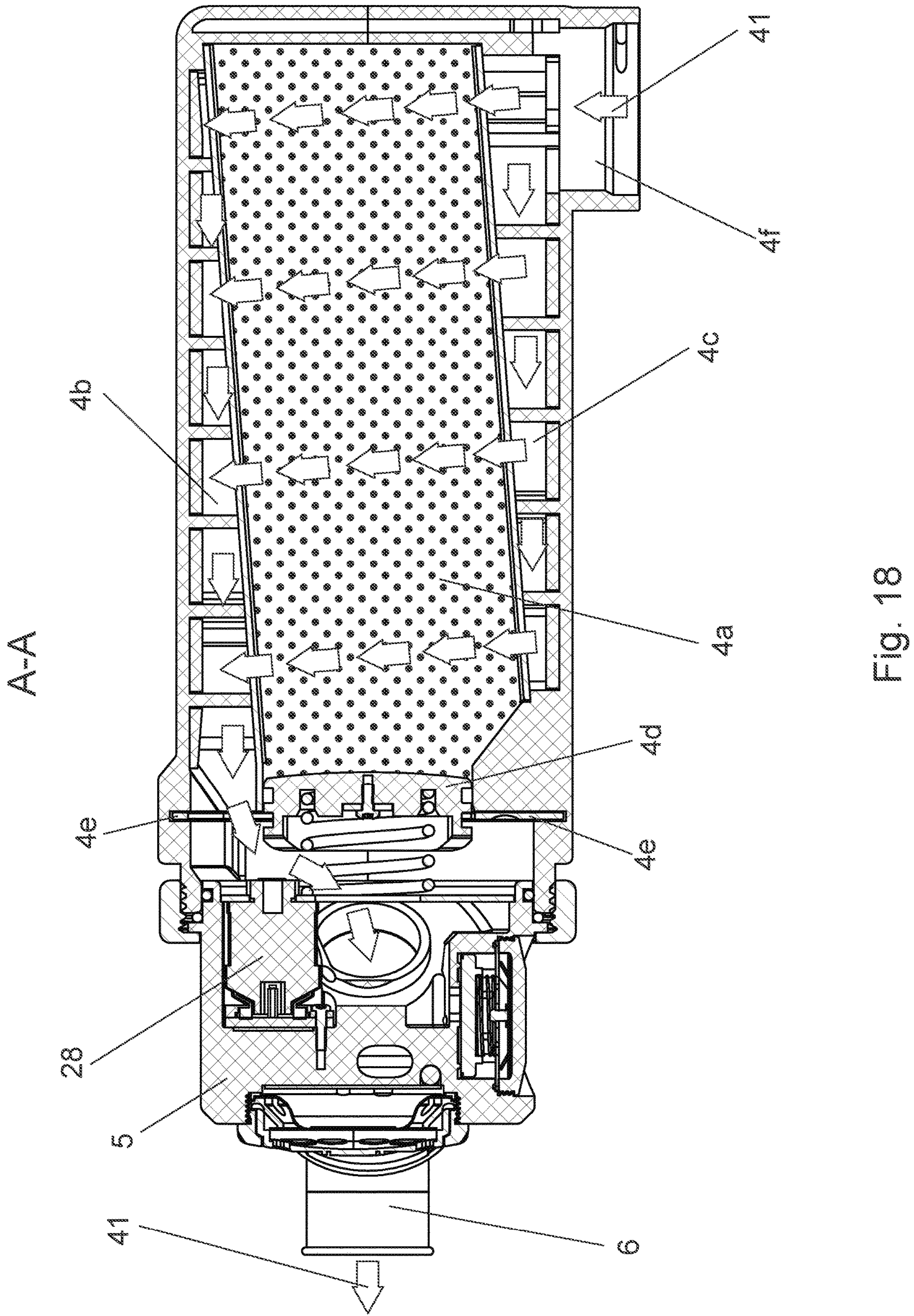
FIG. 18 presents a diagram of gas flow through the scrubber canister and the head of the inhale side ($O_2$ sensors head) on cross-section A-A FIG. 6.
Figure 19:
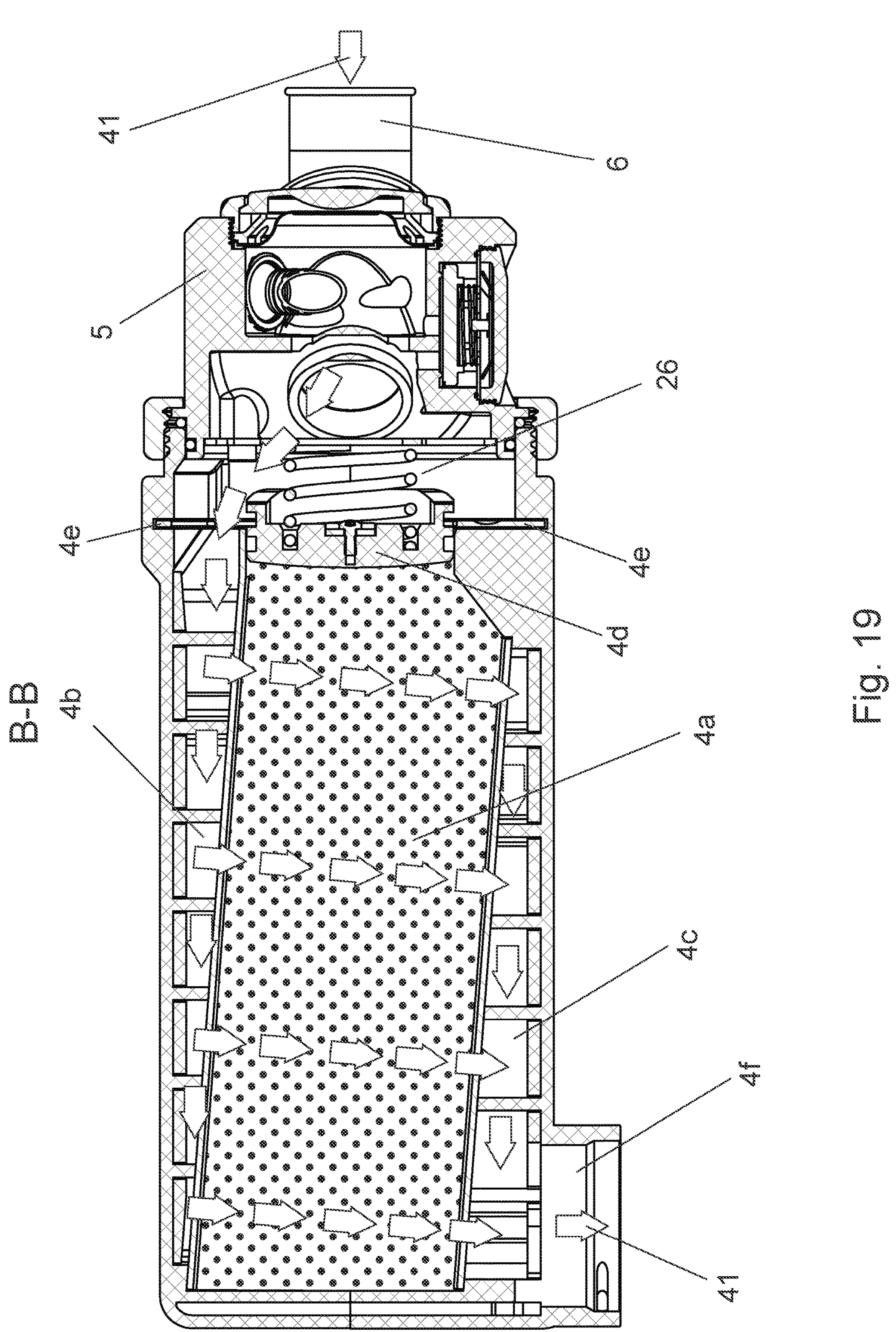
FIG. 19 presents a diagram of the gas flow through the scrubber canister and the head of the exhale side (ADV head) on cross-section B-B FIG. 6.
Figure 20:
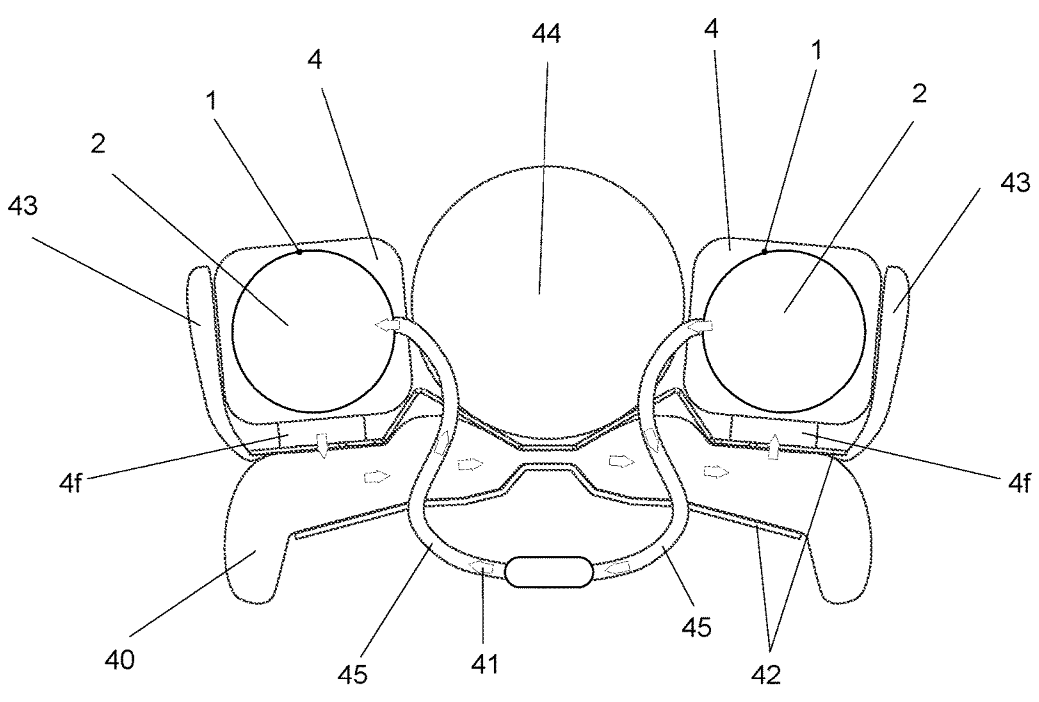
FIG. 20 presents a schematic drawing of an example of a backmount configuration (with one cylinder on the back) using two heads of a closed-circuit diving breathing apparatus (rebreather) and marking of the gas flow direction.
Figure 21:
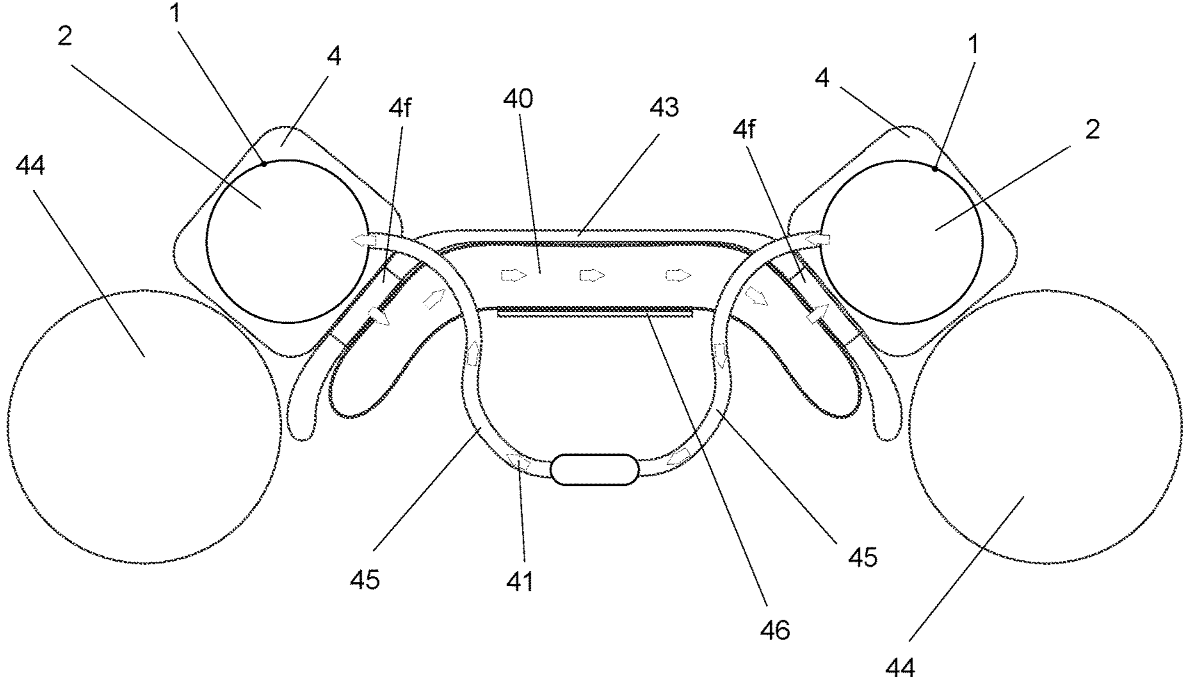
FIG. 21 presents a schematic drawing of an example of a sidemount configuration (with two cylinders on the sides) using two heads of a closed-circuit diving breathing apparatus (rebreather) and marking of the gas flow direction.

In the diving configuration shown on FIG. 15 sidemount with two cylinders on the sides there are two identical scrubber canisters (4). The head (2) on the exhale side is the ADV head and the head on the inhale side is the sensors head. Scrubber canisters (1) with heads are attached to the clamps (not visible on the figure) of the soft diving harness (46) and connected via connector (4*f*) to the counterlung (40). The buoyancy compensator (43) is located below the scrubber canisters (1) with heads. In the configuration shown, two cylinders with diluent (44) (air or trimix) are attached to a soft diving harness (46).

For the sake of figure clarity, some elements such as the MAV manual addition valve, oxygen cylinder and dive computers have been omitted.

In both configurations, the device works identically, the diver's exhalation, thanks to one-way valves, is directed through the breathing loop hose (45) to the head (2) of the first scrubber (exhale side). The gas then passes through the first scrubber canister with the absorbent (4) (exhale side), where it is first cleaned of carbon dioxide and injected into the counterlung (40). The vacuum of inhalation then causes the gas from the counterlung (40) to flow through a second scrubber canister with the absorbent (4) (inhale side), where another carbon dioxide cleaning takes place. The gas flows through the head (2) and then enters the diver's lungs through the breathing loop hose (45).

Summing up, the head (2) of the closed-circuit diving breathing apparatus (rebreather) described in the embodiment provides the ability to work with a new type of scrubber canisters, with cross-flow with channels of constant pressure across the entire cross-section.

The design of the over pressure relief valve (12) presented in the embodiment, its positioning on the bottom of the head (2), at the lowest point of the body (5) and directing the outlet downwards eliminates the possibility of water entering the device through this route. The solution according to the invention ensures complete tightness of the over pressure relief valve (12), even if the piston (14) of the valve (12) is left in the open position below the opening pressure.

The design of the head (2) of a closed-circuit diving breathing apparatus (rebreather) described by the present invention makes it possible to position the water trap (26) in front of the scrubber canister with the absorbent bed (4), and makes it possible to drain the water trap of the liquid accumulated therein. The proposed solution prevents flooding of the absorbent bed (4*a*) with water due to the ability to remove excess water outside the device.

The device according to the invention provides protection of the connectors of the oxygen sensors (28) and the electronics PCB board (38) together with the connectors (38*a*, 38*b*) from the impact of water. It provides free access of gas at the same time eliminating access of liquids. By maintaining the same pressure value on both sides of the hydrophobic membrane of the sensor (28), it allows correct measurement of oxygen concentration.

The head (2) of a closed-circuit diving breathing apparatus (rebreather) according to the invention provides the electronics (38), connectors (38*a*, 38*b*) and sensors (28) with an IP67 protection degree.

LIST OF DESIGNATIONS

1. Scrubber canister of the carbon dioxide absorbent bed including the head
2. Head of the closed-circuit diving breathing apparatus (rebreather)
3. Ring securing the head with scrubber canister
3*a*. Scrubber canister mounting gaskets
4. Canister of the absorbent bed (scrubber)
4*a*. Absorbent bed
4*b*. Upper air channel of the scrubber canister
4*c*. Lower air channel of the scrubber canister
4*d*. Plug of the filling port of the canister with a spring
4*e*. Aperture of the filling port
4*f*. Counterlung connector
5. Head body
5*a*. Canister connection flange
6. Bayonet
7. Connector of the automatic oxygen addition valve
8. Connector of the manual addition valve MAV
9. Elements of the ADV valve including the connector of the diluent gas for the
automatic diluent valve ADV
10. Connector of the primary dive computer
10*a*. Opening of the connector of the primary dive computer
11. Connector of the backup dive computer
11*a*. Opening of the backup dive computer
12. Over pressure relief valve
13. Chamber of the over pressure relief valve
13*a*. Through-hole of the over pressure relief valve
14. Piston of the valve
15. Spring of the piston
16. Seat of the one-way valve
17. One-way umbrella-type valve (check valve)
18. Plug with openings
19. O-ring of the plug with openings
20. Manual flush button
21. Elastic membrane
21*a*. Washer
22. Membrane retaining ring
23. Membrane cover
24. Membrane cover retaining ring
25 Lever
25*a*. First lever arm adjacent to the elastic membrane of the manual flush button
25*b*. Second lever arm adjacent to the piston of the over pressure relief valve
26. Water trap chamber (water trap)
27. Cavity inside the head body
28. Oxygen sensor
29. Mounting seat of the button
30 Button of the automatic diluent valve ADV
31. Cable channel
32 Cable channel cover
32*a*. Ventilation openings of the cable channel cover
33 Rectangular gasket of the cable channel cover
34 Self-adhesive hydrophobic membrane ventilation membrane
35. Silicone gasket of the oxygen sensor
36. Pressure plate of the gaskets
37. Silicone gasket of the PCB
38 Electronics PCB board
38*a*. Connectors of the dive computers
38*b*. Connectors of the oxygen sensors
39 Support plate of the scrubber canister spring
40. Counterlung
41. Direction of gas stream flow
42. Rigid diving harness
43. Buoyancy compensator
44. Diluent cylinder
45. Bayonet hoses
46 Soft diving harness

The invention claimed is:

1. A head (2) of a closed-circuit diving breathing apparatus (rebreather) comprising a body (5), tightly seated through
a flange (5*a*) by means of
a retaining ring (3) in
a canister of
an absorbent bed (4) equipped with
a filling port aperture (4*e*) plugged with
a plug with a spring (4*d*), and
an upper air channel (4*b*) and
a lower air channel (4*c*), provided with at least
one bayonet connector (6), at least
one oxygen connector (7), at least
one diluent gas connector (9) or at least one dive computer connector (10) and in the body
(5) of the head (2) there is
an opening connected to the inside of the body constituting
a mounting seat (29) of
a button (20) and
an opening connected to the inside of the body constituting
a chamber (13) of
an over pressure relief valve (12), characterized in that that the over
pressure relief valve (12) contains, in sequence,
a valve piston (14),
a spring (15),
a seat of the one-way valve (16) and
a one-way valve (17), the spring (15) supported on the seat of the one-way valve (16) pushes the valve piston (14) to the body (5) of the head (2), the one-way valve (17) is attached in the seat of the one-way valve (16) and all components are attached to the body (5) of the head (2) by means of
a plug with
openings (18), the connection of which to the body (5) is sealed with
an o-ring (19).

2. The head (2) of a closed-circuit diving breathing apparatus (rebreather) according to claim 1, characterized in that the over pressure relief valve (12) in a working position of a scrubber (1) is positioned on a bottom of the head (2), in a lowest section of the body (5), with its outlet pointing downward.

3. The head (2) of a closed-circuit diving breathing apparatus (rebreather) according to claim 1, characterized in that in the body (5) of the head (2) there is embedded a lever (25), a first arm (25*a*) of which is adjacent to an elastic membrane (21) of the button (20) and a second arm (25*b*) via a through-hole (13*a*) is adjacent to the valve piston (14) of the over pressure relief valve (12).

4. The head (2) of a closed-circuit diving breathing apparatus (rebreather) according to claim 1, characterized in that inside the body (5) of the head (2), on a side of the flange (5*a*) of the absorbent bed (4), there is a cavity (27) forming, in connection with the absorbent bed (4), a chamber of a water trap (26).

5. The head (2) of a closed-circuit diving breathing apparatus (rebreather) according to claim 4 characterized in that the chamber of the water trap (26) is connected by at least one through-hole (13*a*) to the chamber of the over pressure relief valve (12) and the outlet of the chamber of the water trap (26) is positioned in the chamber (13) of the over pressure relief valve (12).

6. The head (2) of a closed-circuit diving breathing apparatus (rebreather) according to claim 1 characterized in that the body (5) is provided with a cable channel (31) connecting a cavity (27) with the mounting seat (29) of the button (20), to the cable channel (31) comes at least one opening (10*a*) of the dive computer connector (10), to the body (5) from the side of the mounting seat of the button (20) there is attached a cable channel cover (32) provided with ventilation openings (32*a*) protected by a hydrophobic ventilation membrane (34), between the cable channel cover (32) and the body (5) there is a gasket (33), further, a PCB silicone gasket (37), an electronics PCB board (38) and a gasket pressure plate (36) with gaskets (35) are in turn attached to the body (5)

from a side of the cavity (27), electrically connected to the electronics PCB board (38), oxygen sensors (28) are embedded in the gasket pressure plate (36) with the gaskets (35) and fixed by means of a scrubber canister plug spring support plate (39) to the body (5).

* * * * *